(12) United States Patent
Weber

(10) Patent No.: US 9,923,868 B2
(45) Date of Patent: Mar. 20, 2018

(54) WORKING METHOD FOR A SYSTEM AND SYSTEM

(71) Applicant: Fujitsu Technology Solutions Intellectual Property GmbH, München (DE)

(72) Inventor: Uwe Weber, Lünen (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 14/762,545

(22) PCT Filed: Feb. 12, 2015

(86) PCT No.: PCT/EP2015/052984
§ 371 (c)(1),
(2) Date: Jul. 22, 2015

(87) PCT Pub. No.: WO2015/128199
PCT Pub. Date: Sep. 3, 2015

(65) Prior Publication Data
US 2016/0366097 A1    Dec. 15, 2016

(30) Foreign Application Priority Data
Feb. 27, 2014    (DE) .................. 10 2014 102 627

(51) Int. Cl.
*H04L 29/06* (2006.01)
*H04L 29/08* (2006.01)

(52) U.S. Cl.
CPC .......... *H04L 63/0209* (2013.01); *H04L 29/06* (2013.01); *H04L 63/0227* (2013.01); *H04L 63/0428* (2013.01); *H04L 63/145* (2013.01); *H04L 67/06* (2013.01)

(58) Field of Classification Search
CPC ............. H04L 63/0209; H04L 63/0428; H04L 63/145; H04L 67/06
See application file for complete search history.

(56) References Cited

U.S. PATENT DOCUMENTS

| | | | | |
|---|---|---|---|---|
| 5,577,209 A | * | 11/1996 | Boyle | ................. G06F 21/6218 340/5.74 |
| 6,272,538 B1 | * | 8/2001 | Holden | .................. G06F 21/31 709/223 |

(Continued)

FOREIGN PATENT DOCUMENTS

| | | |
|---|---|---|
| DE | 102 41 974 B4 | 1/2006 |
| DE | 10 2005 046 935 B4 | 7/2009 |

(Continued)

*Primary Examiner* — Kambiz Zand
*Assistant Examiner* — Tongoc Tran
(74) *Attorney, Agent, or Firm* — DLA Piper LLP (US)

(57) ABSTRACT

A system includes a first network with a first computer and a first release computer; a second network with a second computer and a second release computer; a perimeter network with a first data server and a second data server; wherein the first network and the second network connect via a firewall to the perimeter network; the first data server has a storage area accessible to the first computer and a storage area inaccessible to the first computer and the second computer; and the system is configured to carry out the method.

10 Claims, 2 Drawing Sheets

(56) References Cited

U.S. PATENT DOCUMENTS

| | | | |
|---|---|---|---|
| 6,510,464 B1* | 1/2003 | Grantges, Jr. | H04L 29/12594 709/224 |
| 9,100,369 B1* | 8/2015 | Fallows | H04L 63/0281 |
| 9,396,349 B1* | 7/2016 | Berfeld | G06F 21/6218 |
| 2002/0054587 A1* | 5/2002 | Baker | G06F 11/0709 370/352 |
| 2003/0123483 A1* | 7/2003 | Donatelli | H04L 29/06 709/229 |
| 2003/0172145 A1* | 9/2003 | Nguyen | G06Q 10/10 709/223 |
| 2003/0177387 A1* | 9/2003 | Osterwalder | H04L 63/0209 726/12 |
| 2005/0240994 A1 | 10/2005 | Burcham et al. | |
| 2006/0200572 A1 | 9/2006 | Schcolnik | |
| 2008/0320127 A1* | 12/2008 | Fries | H04L 63/0209 709/224 |
| 2009/0048883 A1 | 2/2009 | Kelly et al. | |
| 2009/0106518 A1* | 4/2009 | Dow | G06F 3/0613 711/165 |
| 2009/0222904 A1 | 9/2009 | Schmidtke | |

FOREIGN PATENT DOCUMENTS

| | | |
|---|---|---|
| JP | 2000-298612 | 10/2000 |
| JP | 2004-5092 | 1/2004 |
| JP | 2005-352558 | 12/2005 |
| JP | 2006-195726 | 7/2006 |
| JP | 2006-236097 | 9/2006 |
| JP | 2009-245017 | 10/2009 |

\* cited by examiner

WORKING METHOD FOR A SYSTEM AND SYSTEM

TECHNICAL FIELD

This disclosure relates to a working method for a system for the secure provision of a file of a first computer of a first network for retrieval by a second computer of a second network.

BACKGROUND

Today, companies, in particular large companies, are equipped with a complex IT (information technology) infrastructure. Employees of these companies normally have computers at their workplaces which are interconnected by a network architecture such as, for example, the Intranet or Internet, and access central data and resources. The individual computers and the network architecture are administered in many cases by a manufacturer or distributor of the IT infrastructure of the company. The IT infrastructure is normally administered or configured via remote control. In the process of a remote maintenance of this type, it may be necessary to exchange files such as software installation files between a remote maintenance computer of the manufacturer and a computer of an employee of the company. Various requirements apply to a file exchange of this type in terms of a controlled and secure data flow, for example, without manipulation of the file by an unauthorized third party.

It could therefore be helpful to provide a working method for a system for the secure provision of a file of a first computer of a first network for retrieval by a second computer of a second network and a system in which a controlled and secure data flow is guaranteed.

SUMMARY

I provide a working method for a system for secure provision of a file of a first computer of a first network for retrieval by a second computer of a second network, wherein the first and second networks are connected via a firewall to a perimeter network including: transferring the file from the first computer into a storage area accessible to the first computer of a first data server assigned to the perimeter network; signaling receipt of the file in the accessible storage area of the first data server by the first data server to a first release computer of the first network with a release request to forward the file; transferring the file to a storage area of the first data server inaccessible to the first computer following receipt of a release for the forwarding by the first release computer; signaling receipt of the file in the inaccessible storage area of the first data server by the first data server to a second data server of the perimeter network; signaling receipt of the file in the inaccessible storage area of the first data server by the second data server to a second release computer of the second network with a release request to forward the file; transferring the file into a storage area of the second data server inaccessible to the second computer following receipt of a release for the forwarding of the file by the second release computer; and transferring the file onto a storage area of the second data server accessible to the second computer.

I further provide a system including: a first network with a first computer and a first release computer; a second network with a second computer and a second release computer; a perimeter network with a first data server and a second data server; wherein the first network and the second network connect via a firewall to the perimeter network; the first data server has a storage area accessible to the first computer and a storage area inaccessible to the first computer and the second computer; and the system is configured to carry out the method.

REFERENCE NUMBER LIST

Figure 1:
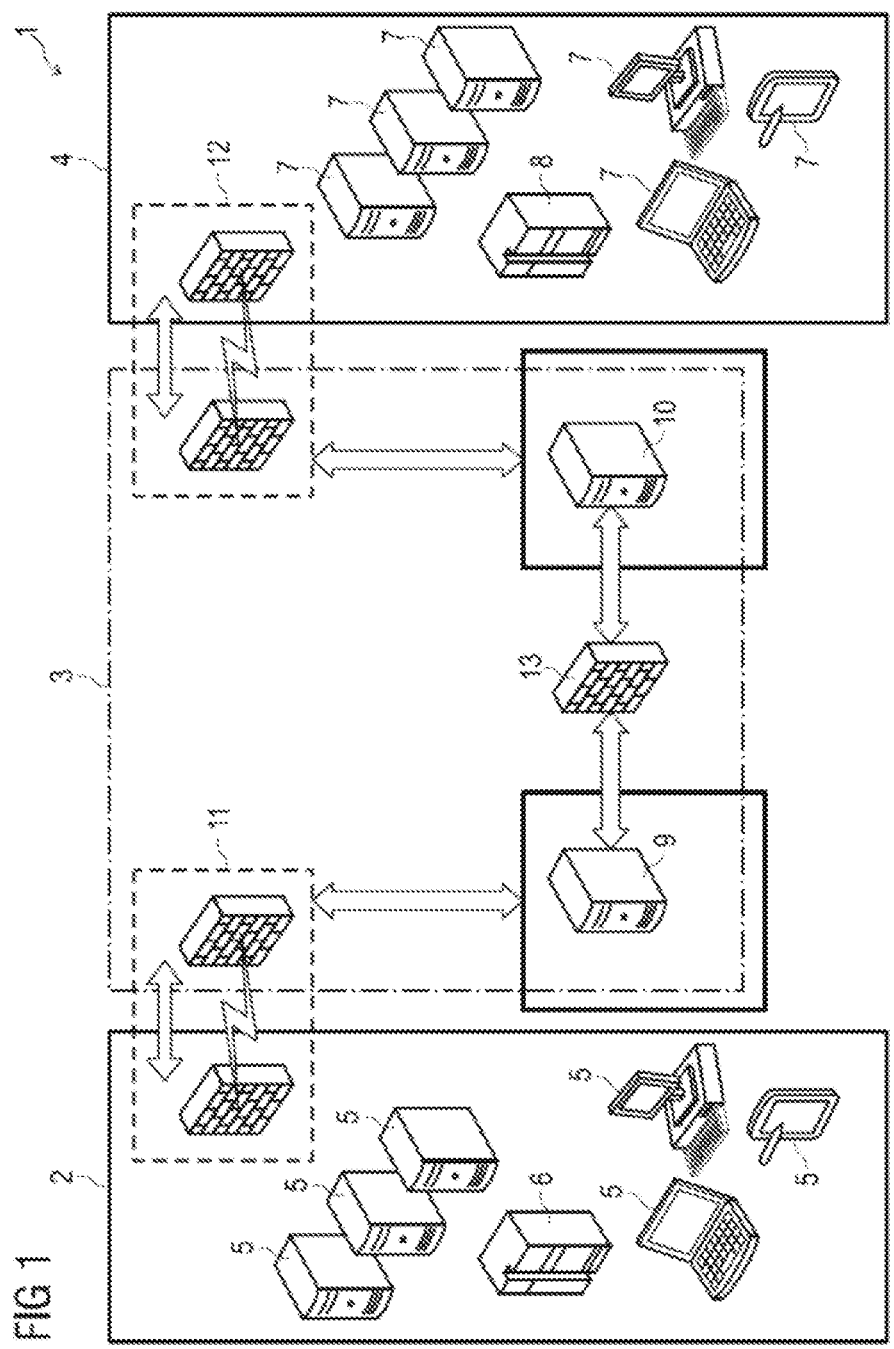
FIG. 1 shows a schematic representation of a system.

1 System
2 First network
3 Perimeter network
4 Second network
5 First computer
6 First release computer
7 Second computer
8 Second release computer
9 First data server
10 Second data server
11 First firewall
12 Second firewall
13 Third firewall
14 Working method
S0 to S17 Steps

DETAILED DESCRIPTION

I provide a working method for a system for the secure provision of a file of a first computer of a first network for retrieval by a second computer of a second network, wherein the first network and the second network connect in each case via a firewall to a perimeter network. The working method has the following steps:

transferring the file from the first computer into a storage area, accessible to the first computer, of a first data server belonging to the perimeter network;

signaling receipt of the file in the accessible storage area of the first data server to a first release computer of the first network with a release request to forward the file;

transferring the file to a storage area of the first data server inaccessible to the first computer following receipt of a release for the forwarding by the first release computer;

signaling receipt of the file in the inaccessible storage area of the first data server to a second data server of the perimeter network;

signaling receipt of the file in the inaccessible storage area of the first data server to a second release computer of the second network with a release request to forward the file;

transferring the file into a storage area of the second data server inaccessible to the second computer following receipt of a release for the forwarding of the file by the second release computer; and transferring the file onto a storage area of the second data server accessible to the second computer.

By the aforementioned working method, a secure provision of a file of a first computer of a first network for retrieval of the file by a second computer of a second network is guaranteed. The first network and the second network are not directly, but rather indirectly, interconnected, for example, via a firewall. A direct connection of two networks represents a considerable security risk and offers, for example, the possibility of potential harmful access of an unauthorized third party. The first network which is, for example, a corporate network, and the second network which is, for example, a manufacturer's network therefore connect to a first data server and a second data server respectively of the perimeter network. A firewall, for example, is interposed between the respective connection.

The first data server is not connected to the second computer of the second network and is therefore decoupled from the latter. Similarly, the second data server is not connected to the first computer of the first network. Moreover, the first network and the second network are decoupled from one another. Since the first network and the second network are segregated from one another and the first data server and the second data server independently perform the data exchange, a segregation of the networks and the computers is guaranteed. This guarantees a controlled file exchange and data flow and a protection against access by unauthorized third parties.

A further advantage of the working method is that both a second instance of the first network, namely the first release computer, and a second instance of the second network, namely the second release computer, must consent to the file exchange so that an additional security is thus provided. As a result, for example, a check is carried out twice to ensure that the correct files are actually also exchanged in the intended file exchange. As a result, the file exchange is checked and/or released independently from the first computer and the second computer.

Advantageously, following the steps of transferring the file onto the accessible storage area of the first data server and/or into the secure storage area of the second data server, the file is checked in each case for data technology risks. As a result, for example, a file infected by a virus or Trojan or otherwise manipulated can be detected.

Optionally, following detection of a data technology risk, the infected file can be discarded, i.e., for example, deleted, so that this file cannot cause any damage in a network or on a computer.

Further advantageously, the step of signaling receipt of the file to the first release computer and/or to the second release computer comprises sending an email. A facility is thus provided by which the file receipt can be notified.

I also provide a system configured to carry out the working method. The system essentially enables the aforementioned advantages.

Further examples and advantages are described in the following description with reference to the attached figures.

Figure 2:
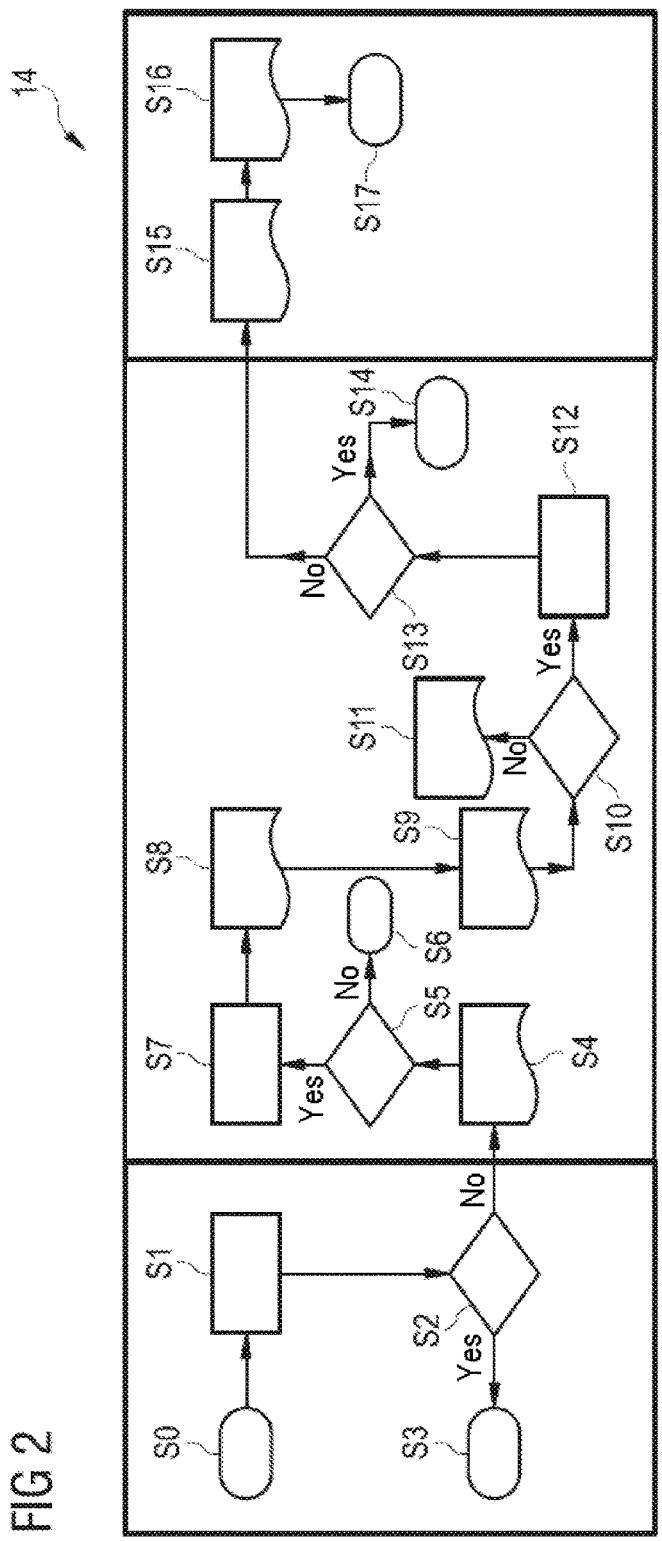
FIG. 2 shows a flow diagram of a working method for the system for the secure provision of a file.

FIG. 1 shows a system 1 having a first network 2, a perimeter network 3 and a second network 4. The system 1 can also be referred to as a computer network infrastructure. The two networks 2 and 4 are set-up as communication networks such as, for example, a Local Area Network (LAN) or as a Wide Area Network (WAN). The first network 2 represents the network of a company. The second network 4 represents the network of a manufacturer and is set up geographically distanced from the first network 2. The two networks 2 and 4 may alternatively also represent other networks and do not necessarily have to be disposed geographically distanced. The perimeter network 3 is an intermediate network via which a controlled and secure file exchange, as described later with reference to FIG. 2, is enabled. The perimeter network 3 may, for example, be the Internet or a WAN.

Alternatively, the perimeter network 3 can also be set-up as a so-called demilitarized zone (DMZ) which represents a computer network with security-technology-based, controlled access facilities. Computers within the DMZ are typically connected by one or more firewalls to other networks such as the first network 2 and the second network 4. The access to individual services of the computers of the DMZ can be permitted, for example, through release or opening of specific ports.

A plurality of first computers 5 and a first release computer 6 belong to the first network 2. The first computer 5 and the release computer 6 may, for example, be conventional tower PCs, desktop PCs, notebooks, laptops or tablet PCs. Within the first network 2, the first computers 5 and the first release computer 6 can communicate with one another, wherein, protocols such as TCP, UDP, SMB, NFS and/or AFP are used for the exchange of data. It should be noted that the number of first computers 5 and the release computer 6 may differ from the example shown in FIG. 1. The first release computer 6 represents an instance of a higher order than the first computer 5, for example, a line manager of an employee and/or an admin. This means that higher rights are vested in the first release computer 6 than in the first computer 5.

The second network 4 is set-up in keeping with the first network 2 and comprises a plurality of second computers 7 and a second release computer 8.

The perimeter network 3 has a first data server 9 and a second data server 10. The two servers are secure FTP (File Transfer Protocol) servers. One or both data servers 9 and 10 can be disposed at different geographical locations, for example, with the manufacturer or company. For example, the perimeter network 3 can be set-up as a virtual network (VPN). In one particularly secure variant, the data servers 9 and 10 can form part of a network of a third party, for example, a network provider, independent from the networks 2 and 4. Furthermore, one or both data servers 9 and 10 may be a cloud server.

Each of the two data servers 9 and 10 has at least one storage device with two different storage areas. The storage device may in each case comprise one or more physical storage media. The first data server 9 has a storage area accessible to the first computer 5 and a storage area inaccessible to a first computer 5. The accessible storage area of the first data server 9 is a part of the storage device which a first computer 5 from the first network 2 can access. This accessible storage area can also be referred to as the transfer storage area of the first data server 9.

A file exchange between the first computer 5 and the first data server 9 and a second computer 7 and the second data server 10 is performed according to the Secure File Transfer Protocol (SFTP). The first computer 5 must first authenticate itself to the data server 9, for example, by a username and password. The first computer 9 thus establishes a connection to the first data server 9. It is thus possible for a first computer 5 to store one or more files in the accessible storage area of the first data server 9. Alternatively, however, other data transfer protocols are also possible.

A first firewall 11 which protects the computers of the first network 2 and the first data server 9 against unwanted network access is interposed between the perimeter network 3 and the first network 2. The first firewall 11 serves to regulate network access to the first data server 9 and essentially restrict it to a communication with the first network. The first firewall 11 monitors the data traffic running through the first firewall 11 and decides, on the basis of predefined rules, whether a network communication, i.e., for example, a data exchange, is permitted. For example, the first firewall 11 allows a data exchange only according to predefined protocols, only via predefined ports and/or only for predefined network addresses of the first network 2.

A situation similar to that of the first data server 9 exists with the accessible storage area of the second data server 10 accessible to a second computer 7 of the second network 4. In this case, the second network 4 connects via a second firewall 12 in the same way as the first firewall 11 to the perimeter network 3, wherein the second firewall 12 essentially allows exclusively a network communication between the second data server 10 and the second network 4.

The inaccessible storage areas of the first data server 9 and the second data server 10 are storage areas which are inaccessible to any of the computers of the first network 2 or the second network 4. It is therefore not possible for any of the computers 5, 6, 7 or 8 to store files in one of the inaccessible storage areas. The first firewall 11 and the second firewall 12 enable no direct network communication between a computer of the first network 2 and a computer of the second network 4.

The first data server 9 and the second data server 10 interconnect via a third firewall 13 for a communication according to the SFTP protocol. The third firewall 13 is configured in keeping with the two firewalls 11 and 12 and allows exclusively a network communication between the first data server 9 and the second data server 10. The data servers 9 and 10 are configured for an exclusive data exchange with one another.

The first data server 9 is under the exclusive administrative access of the first release computer 6, which can thus perform an administration of the data server 9. Similarly, the second data server 10 is under the exclusive administrative access of the second release computer 8 of the second network 4.

It should be noted at this point that none of the computers of the first network 2 can access the second data server 10 or communicate with the latter. The computers of the first network 2 are thus segregated from the second data server 10. A similar situation exists with the computers of the second network 4, which cannot access the first data server 9. Optionally, only specific, authorized first computers 5 of the first network 2 may also be allowed to access the accessible storage area of the first data server 9. A similar situation is also conceivable for some of the second computers 7 of the second network 4 to access the accessible storage area of the second data server 10. There are various options to implement access control of this type. The communication between a data server 9 or 10 and a further computer of the different network, for example, the first computer 5 or a second computer 7, may thus be restricted, for example, by specifying defined IP addresses. Furthermore, access rights may be necessary for the communication of the servers. Additionally or alternatively, an encrypted network communication or an encrypted network transfer may be provided. Additionally or alternatively, digital certificates or digital keys can be used to authenticate a computer 5 or 7 as a confidential source and to enable it to access the respective accessible storage area. Furthermore, one or more adapted firewalls can control the communication.

The system 1 described with reference to FIG. 1 is configured to carry out a working method 14 for the secure provision of a file of a first computer 5 of the first network 2 for retrieval by a second computer 7 of the second network 4, which is described below by the flow diagram shown in FIG. 2.

The working method 14 is started in a step S0, wherein, if necessary, variables are initialized.

In a first step S1, a first computer 5 transfers a file into the accessible storage area of the first data server 9. To do this, the first computer 5 authenticates itself according to the SFTP protocol to the data server 9 and stores the file in the accessible storage area of the first data server 9.

The first data server 9 is configured to monitor the accessible storage area, in particular its file system, in terms of storage activities or storage modifications. Write access to the accessible storage area is detected, for example, by a daemon process which initiates the further procedure of the working method 14.

If it is detected that the file of the first computer 5 has been transferred into the accessible storage area of the first data server 9, the file is checked in the next step S2 by the first data server 9 for data technology risks.

In the second step S2, a check is carried out, for example, by software running on the first data server 9 to determine whether the file is a harmful file, i.e., for example, a file infected with a virus or with the Trojan.

If a harmful file of this type is detected, the file is discarded, for example, deleted or moved to a quarantine area, in a step S3. Optionally, following step S3, deletion of the file can be signaled to a computer, for example, the computer 5 of the first network 2 transferring the file or the first release computer 6. Signaling can be performed, for example, through dispatch of a corresponding electronic notification such as an email message by the first data server 9. To do this, the first data server 9 is configured as a server email server. The dispatch of the email message can be performed according to one of the following protocols: SMTP, IMAP and/or POP3. Alternatively, signaling can also be performed by generating audible or visual signals, for example, by a loudspeaker or an LED. In a further alternative, a file can also be generated, for example, on the data server 9 itself, the first computer 5 or the first release computer 6. In a further alternative, digital network messages can also be dispatched, for example, according to the SNMP network protocol (Simple Network Management Protocol).

If it is established during the file check that a proper, i.e. harmless, file is involved, the working method 14 is continued with a step S4 in which the receipt of the file is signaled in the accessible storage area of the first data server 9 to the first release computer 6 with a release request to forward the file. In other words, the first release computer 6 is informed by the first data server 9 that a proper, secure file has been stored in the accessible storage area of the first data server 9. Signaling may again comprise dispatch of an electronic notification to the first release computer 6. Alternatively, receipt of the file can also be signaled in another manner, for example, by the first computer 5 or the first release computer 6.

In a next step S5, a check is then carried out to determine whether the first release computer 6 issues a release to forward the file. The release is similarly effected by dispatching an email message to the first data server 9 according to one of the above-mentioned protocols.

If the first data server 9 receives no release to forward the file, the file is discarded in a step S6. In keeping with step S3, an electronic notification can also be dispatched following step S6. Discarding the file may be triggered, for example, by expiration of a specific time interval without receipt of a release. Alternatively, it is also possible that the first release computer 6 actively declines forwarding of the file and reports this to the first data server 9, for example, again by dispatch of an electronic notification.

If the first release computer 6 consents to forwarding the file, the file is transferred in a step S7 following the step S5 onto the storage area of the first data server 9 inaccessible to the first computer 5.

In a next step S8, the first data server 9 signals to the second data server 10 that the file has been transferred into the inaccessible storage area of the first data server 9. Various options again exist for the signaling such as, for example, on the basis of step S3.

In a next step S9, the second data server 10 signals the receipt of the file in the inaccessible storage area of the first data server 9 to the second release computer 8 with the release request to forward the file. This signaling essentially corresponds to that of step S4.

In keeping with step S5, a check is then carried out in step S10 to determine whether a release to forward the file has been received.

If no release to forward the file is received by the second release computer 8, step S10 is continued with step S11 in which, in keeping with the sixth step S6, the file is discarded.

If a release to forward the file is notified, the tenth step S10 is continued with a step S12 in which the file is transferred into a storage area of the second data server 10 inaccessible to the second computer 7.

In a next step S13, in keeping with step S2, the file is again checked for data technology risks. If a data technology risk is identified, in a next step S14 in keeping with step S3 working method.

If no data technology risk is identified, step S13 is continued with a step S15 in which the file is copied into a storage area of the second data server 10 accessible to the second computer 7.

In a further step S16, it is signaled to the second computer 7, as described above, that the file is available on a storage area of the second data server accessible to the second computer 7.

The working method is terminated in a step S17.

In the working method 14 described with reference to FIG. 2, some steps can optionally also be omitted. Thus, for example, a check for data technology risks according to one of steps S2 or S13 can be dispensed with. Furthermore, for example, the signaling in step S16 can be dispensed with.

Optionally, the working method 14 can be discontinued and terminated after one of steps S3, S6, S12 and/or S15.

Optionally, in one or more steps of the working method 14, an entry can be written in each case into a log file. The log file may be stored, for example, on the first computer 5, the second computer 7, or the two release computers 6 or 8. Alternatively, the log file can also be stored on a data server 9 or 10, for example, in the accessible storage area. A step of the described working method 14 may, for example, be triggered as a result. Furthermore, it may be provided in each case that only an authenticated person, for example, an administrator can access this log file. Additionally or alternatively, the log file can be marked or characterized accordingly so that, for example, the request and/or issue of the release according to steps S5 to S7 and S9 to S11 can be dispensed with. Alternatively, a plurality of log files can also be stored, for example, a log file for each computer or server involved in the working method 14.

A log file is also referred to as an event log file and lists the actions or steps of the working method 14. For example, the time at which a given step of the working method was carried out and/or the file that was involved can be listed there. A reconstruction of the working method 14 can thus be carried out later, for example, during an investigation on the basis of the log file.

By the described working method 14, a controlled file exchange between a first computer 5 and a second computer 7 can be guaranteed. In summary, it is necessary in the working method 14 that both a first release computer 6 of the first network 2 and a second release computer 8 of the second network 4 must consent to the file exchange. The file exchange is thus checked by two instances as a result of which the security and control over the file exchange are high. A further advantage of the described working method 14 is that the first network 2 and the second network 4 are not interconnected. A further advantage is that the first data server 9 and the second data server 10 independently organize the file exchange between the inaccessible storage area, thereby reducing the risk of an intervention of unauthorized third parties.

The working method 14 described with reference to the figures can also run in reverse if a second computer 7 wishes to provide a file to a first computer 5. Steps S0 to S17 described above are then carried out accordingly.

The invention claimed is:

1. A working method for a system for secure provision of a file of a first computer of a first network for retrieval by a second computer of a second network, wherein the first and the second networks are connected via a firewall to a perimeter network comprising:
   transferring the file from the first computer into a storage area accessible to the first computer of a first data server assigned to the perimeter network;
   signaling receipt of the file in the accessible storage area of the first data server by the first data server to a first release computer of the first network with a release request to forward the file;
   transferring the file to a storage area of the first data server inaccessible to the first computer following receipt of a release for the forwarding by the first release computer;
   signaling receipt of the file in the inaccessible storage area of the first data server by the first data server to a second data server of the perimeter network;
   signaling receipt of the file in the inaccessible storage area of the first data server by the second data server to a second release computer of the second network with a release request to forward the file;
   transferring the file into a storage area of the second data server inaccessible to the second computer following receipt of a release for the forwarding of the file by the second release computer; and
   transferring the file onto a storage area of the second data server accessible to the second computer, wherein
   the first data server is not connected to the second computer of the second network and is thereby decoupled from the second network,
   the second data server is not connected to the first computer of the first network,
   the first network and the second network are segregated from one another and the first data server and the second data server independently perform the data exchange,
   a controlled file exchange between the first computer and the second computer is guaranteed,
   both a first release computer of the first network and a second release computer of the second network must consent to the file exchange, and
   the first data server and the second data server independently organize the file exchange between the inaccessible storage areas.

2. The method according to claim 1, wherein, following transferring the file onto the accessible storage area of the first data server, the first data server checks the file for data technology risks.

3. The method according to claim 1, wherein, following transferring the file into the secure storage area of the second data server, the second data server checks the file for data technology risks.

4. The method according to claim 2, wherein, if a data technology risk is identified, the file is discarded and the method is discontinued.

5. The method according to claim 1, wherein, in signaling receipt of the file to the first release computer and/or to the second release computer within a predefined time interval following receipt of no release to forward the file, the file is discarded and the method is discontinued.

6. The method according to claim 1, wherein signaling receipt of the file to the first release computer and/or to the second release computer comprises sending an email.

7. The method according to claim 1, wherein the file is transferred according to the Secure File Transfer Protocol.

8. The method according to claim 1, wherein the first and second data servers interconnect via a firewall.

9. The method according to claim 1, wherein an entry is written into a log file after each step of the method.

10. A system comprising:
   a first network with a first computer and a first release computer;
   a second network with a second computer and a second release computer;
   a perimeter network with a first data server and a second data server;
   wherein
   the first network and the second network connect via a firewall to the perimeter network;
   the first data server has a storage area accessible to the first computer and a storage area inaccessible to the first computer and the second computer; and
   the system is configured to carry out the method according to claim 1.

* * * * *